US 6,607,703 B1

(12) United States Patent
Tomizawa et al.

(10) Patent No.: US 6,607,703 B1
(45) Date of Patent: Aug. 19, 2003

(54) HYDROGEN GENERATOR

(75) Inventors: Takeshi Tomizawa, Ikoma (JP); Kunihiro Ukai, Ikoma (JP); Kiyoshi Taguchi, Moriguchi (JP); Toshiyuki Shono, Kyoto (JP); Kouichiro Kitagawa, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/577,364

(22) Filed: May 23, 2000

(30) Foreign Application Priority Data

May 24, 1999 (JP) .......................................... 11-143844

(51) Int. Cl.[7] .............................. B01D 1/00; A61L 9/00
(52) U.S. Cl. ....................... 422/305; 422/285; 422/306; 422/308
(58) Field of Search ..................... 422/244, 285–292, 422/300, 305–308, 311, 312

(56) References Cited

U.S. PATENT DOCUMENTS

| 3,909,299 | A | * | 9/1975 | Corrigan | |
|---|---|---|---|---|---|
| 3,909,446 | A | * | 9/1975 | Miyashita et al. | |
| 4,567,857 | A | * | 2/1986 | Housemann et al. | |
| 4,861,348 | A | | 8/1989 | Koyama et al. | 48/94 |
| 5,401,589 | A | | 3/1995 | Palmer et al. | 427/13 |
| 5,484,577 | A | | 1/1996 | Buswell et al. | 422/211 |
| 5,932,181 | A | * | 8/1999 | Klm et al. | |

FOREIGN PATENT DOCUMENTS

| EP | 0 798 798 A | 10/1997 |
|---|---|---|
| EP | 0 861 802 A | 9/1998 |
| EP | 0 922 666 A | 6/1999 |
| JP | 49-090302 | 8/1974 |
| JP | 57-7198 | 9/1982 |
| JP | 60-547 | 8/1985 |
| JP | 62-207701 | 9/1987 |
| JP | 11-106204 | 4/1999 |
| JP | 2000-281311 | 10/2000 |
| WO | WO 90/00361 | 1/1998 |

* cited by examiner

Primary Examiner—Robert J. Warden, Sr.
Assistant Examiner—Monzer R. Chorbaji
(74) Attorney, Agent, or Firm—McDermott, Will & Emery

(57) ABSTRACT

The present specification discloses a hydrogen generator for generating a hydrogen gas, comprising at least a fuel supply part for supplying a hydrocarbon type fuel, a fuel combustion part, a water supply part, a gas, mixing part for mixing the fuel and a water, and a reforming part filled with the reforming catalyst, wherein at least one of the gas mixing part and the reforming part is heated by an exhaust gas generated in the combustion part. The hydrogen generator according to the present invention aims to improve the heat efficiency, reducing the heat loss from the apparatus with a simple constitution and collecting the waste heat for an effective use thereof.

7 Claims, 3 Drawing Sheets

HYDROGEN GENERATOR

BACKGROUND OF THE INVENTION

The present invention relates to an apparatus for generating a hydrogen gas to be supplied to appliances that use hydrogen such as fuel cells from water and a hydrocarbon type fuel such as natural gas, liquefied petroleum gas, gasoline, naphtha or kerosene used as raw materials.

Recently, hydrogen gas has drawn much attention as a convincing alternative energy source to replace a fossil fuel. For an efficient use of hydrogen, it is necessary to prepare a so-called industrial infrastructure such as pipelines for hydrogen.

From such a point of view, it has been proposed to use an infrastructure for transporting natural gas, fossil fuel, alcohol or the like and reform these fuels to generate hydrogen in the place where hydrogen is needed. For example, techniques for reforming natural gas (city gas) to be supplied to fuel cells used as a medium and small-scale on-site power generator and techniques for reforming methanol to be supplied to fuel cells used as a power source for cars have been proposed in various manners.

On the other hand, the technique for solid polymer fuel cells has remarkably been developed in recent years and such fuel cells are considered to be suitable for small scale use because they can operate under low temperature, start-up quickly and have less heat loss. For such a reason, these fuel cells are expected to further develop into automobile and domestic use.

In order to meet such an expectation, a small-size hydrogen generator for supplying hydrogen to solid polymer fuel cells has vigorously been developed in various quarters. However, an apparatus that sufficiently meets the demand has not been commercially available yet.

It should be noted that as the method for generating hydrogen from a hydrocarbon type fuel such as natural gas, a partial oxidation method, a steam reforming method and a use of both methods together are known. However, each of them has advantages as well as disadvantages and they are chosen according to the object of the system including fuel cells that use hydrogen to be generated. In general, the steam reforming method can generate a gas having the highest concentration of hydrogen; therefore a high generation efficiency of the fuel cells can be estimated. In order to reform the fuels as described above, a catalytic reaction under high temperature is employed in any of the above methods.

A conventional hydrogen generator for fuel cells has usually been in a scale where the output of fuel cells can be brought to not less than several hundred kW, therefore an apparatus that can supply to fuel cells in the level of between several hundred W and several kW, which is suitable for domestic or portable use, has been difficult to produce until now.

This is because the proportion of the surface of the hydrogen generator to its volume becomes large as the scale of the apparatus becomes small and consequently the rate of the heat dissipation loss from the surface of the apparatus becomes large; as a result, the heat efficiency is impaired.

In other words, there is a problem that a decrease in efficiency of the hydrogen generator itself leads to a decrease in efficiency of the system including fuel cells, so the heat efficiency of the hydrogen generator needs to be improved in order to realize a small-size system including fuel cells. Especially when natural gas is used as the fuel, a high temperature of around 700° C. is required as the reaction temperature; therefore, in view of heat utilization, a heat insulating constitution for reducing the heat dissipation loss and a method for collecting and using waste heat are considered to be the most important points.

Considering the facts as described above, an object of the present invention is to provide a hydrogen generator having a simple structure that can, in particular, collect and efficiently use waste heat to significantly improve the heat efficiency.

BRIEF SUMMARY OF THE INVENTION

The present invention is related to a hydrogen generator for generating a hydrogen gas, comprising at least a fuel supply part for supplying a hydrocarbon type fuel, a fuel combustion part, a water supply part, a gas mixing part for mixing the fuel and a water, and a reforming part filled with the reforming catalyst, wherein at least one of the gas mixing part and the reforming part is heated by an exhaust gas generated in the fuel combustion part.

In concrete, the present invention related to a hydrogen generator for generating a reformed gas containing hydrogen from a gas mixture to be reformed by catalysis of a reforming catalyst, comprising at least a fuel supply part for supplying a hydrocarbon type fuel, a fuel combustion part, a water supply part, a gas mixing part for preparing the above gas mixture to be reformed by mixing the above fuel and a water, and a reforming part filled with the above reforming catalyst, wherein at least one of the above gas mixing part and the above reforming part is heated by an exhaust gas generated in the above fuel combustion part.

In other words, the hydrogen generator of the present invention has a constitutional structure so that at least one of the gas mixing part and the reforming part can be heated by an exhaust gas generated in the fuel combustion part.

It is preferable that a water vaporization part is placed between the water supply part and the gas mixing part and the water vaporization part is heated by the exhaust gas generated in the fuel combustion part.

Further, it is preferable that an air to be supplied to the fuel combustion part is heated by combustion heat of the fuel combustion part.

In addition, it is preferable that a pre-heating part for heating at least one of the hydrocarbon type fuel and the air to be supplied to combustion is provided on the periphery of the fuel combustion part.

Moreover, it is preferable that the flow of the exhaust gas and the flow of a mixed gas of the fuel and the water to be reformed are placed at reverse direction with each other.

In other words, it is preferable that the flow direction of the exhaust gas and the flow direction of the gas mixture to be reformed are counter to each other.

DETAILED DESCRIPTION OF THE INVENTION

The inventors of the present invention have studied the disposition of each component constituting a hydrogen generator in various manners and they have finally invented a hydrogen generator with significantly improved heat efficiency.

In the followings, the hydrogen generator of the present invention will be described by way of embodiments, yet the present invention is not limited to these embodiments.

Embodiment 1

The first embodiment of the present invention will be described with reference to FIG. 1.

Figure 1:
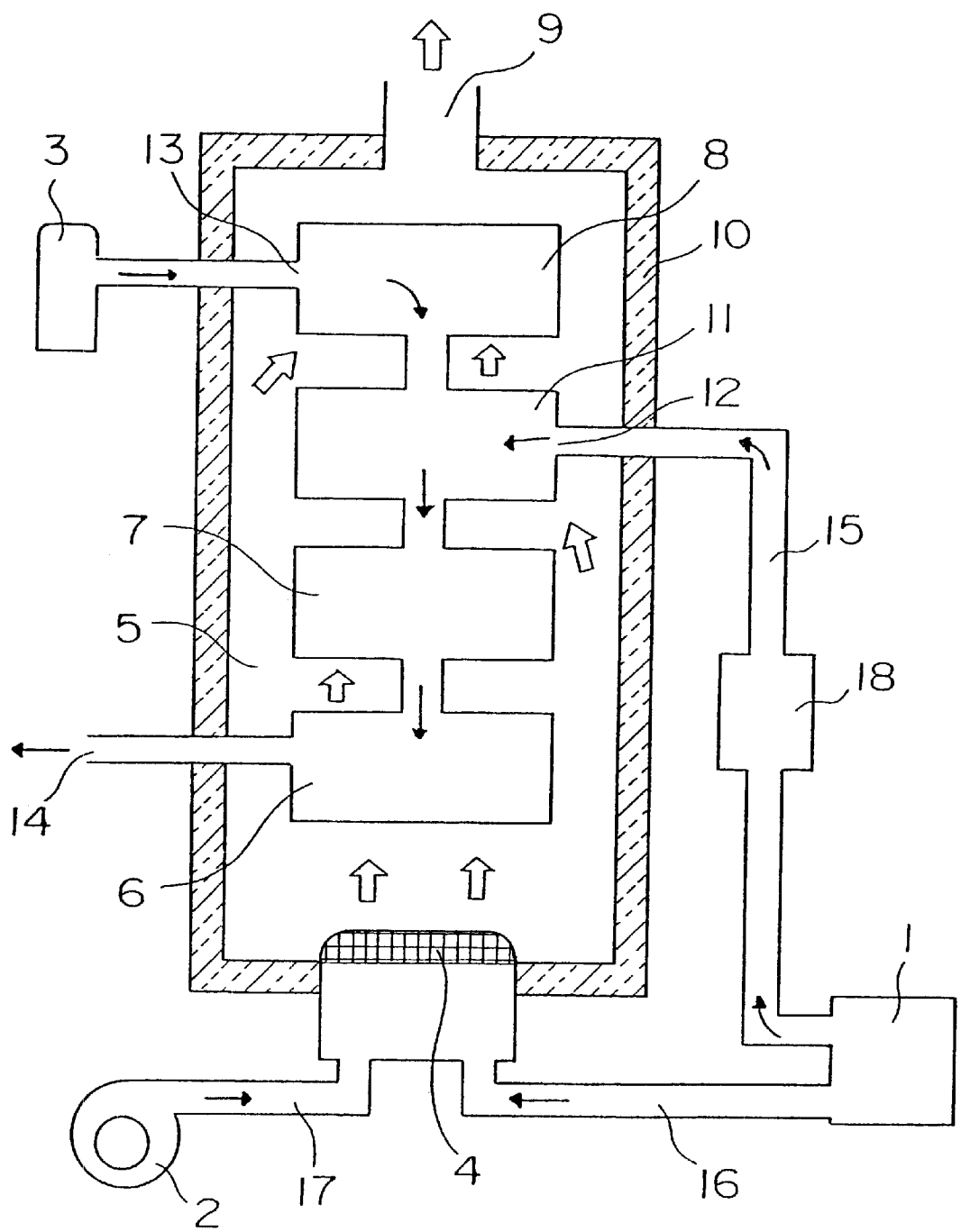
FIG. 1 is a schematic view showing the constitution of a hydrogen generator according to the first embodiment of the present invention.

FIG. 1 is a schematic view showing the constitution of one embodiment of the hydrogen generator of the present invention.

As shown in FIG. 1, the hydrogen generator according to the present invention comprises a fuel supply part for supplying a hydrocarbon type fuel 1, a water supply part 3, a water vaporization part 8, a gas mixing part 11 for preparing a raw material mixture (gas mixture to be reformed) by mixing the hydrocarbon type fuel and the water, a heating part for the raw material mixture 7, a reforming part 6 filled with a reforming catalyst, a combustion part 4 for heating the reforming part and a combustion chamber 5 where an exhaust gas generated upon combustion and released outside passes through. This apparatus generates a reformed gas containing hydrogen by bringing a hydrocarbon type fuel to react with water vapor (steam) and it is constituted in such a way that at least the reforming part 6 and the water vaporization part 8 are placed inside the combustion chamber 5 or brought into contact with the combustion chamber 5 in such a way that the flow of the exhaust gas and the flow of the raw material mixture of the fuel and the water are placed at reverse direction with each other.

There is no specific restriction for a hydrocarbon type fuel as far as it can be used for generating hydrogen. For example, methane, natural gas, liquefied petroleum gas, naphtha, gasoline, kerosene and methanol can be used. Here, the case in which city gas mainly composed of natural gas, is used will be described.

The city gas contains a few ppm of sulfide as an odorant; a sulfide usually becomes a poisoning substance for the reforming catalyst, so a raw material (fuel) gas mixture passage or path 15 is provided with a desulfuration part 18 of adsorption type in the middle thereof. Water, which is the other raw material, is supplied from the water supply part 3. The reforming part 6 is heated by the combustion part 4 and the city gas supplied from the fuel supply part 1 is combusted with the air supplied from the air supply part 2. The combustion part 4 also includes a mixing part for mixing the city gas as the fuel and the air for combustion (not shown in the figure).

The exhaust gas after combustion in the combustion part 4 passes through the combustion chamber 5 and discharged outside the apparatus from an exhaust vent 9. A reforming part 6, a heating part 7, a mixing part 11 and a water vaporization part 8 are provided in the combustion chamber 5. The heat insulating part 10 prevents heat dissipation from the combustion chamber 5 and can be made from a ceramic type fiber material having heat resistance, for example, and constituted in such a way that it covers the entire combustion part 5. Further, a fuel gas supply port 12 for supplying a fuel gas to the mixing part 11, a water supply port 13, an exit for reformed gas 14, a fuel gas passage 15, a passage 16 for fuel gas for combustion and a passage 17 for air for combustion are provided.

The reforming part 6 is provided with a reforming catalyst layer and the reforming catalyst layer used here can be formed by a usually employed method, for example by filling a pelletized reforming catalyst. The reforming catalyst may be selected from a noble metal type such as ruthenium or a metal type such as nickel according to the kind of the hydrocarbon type fuel to be used as the raw material or the conditions for operating the hydrogen generator.

It is preferable to fill the water vaporization part 8 with a heat-resistant porous material to increase the water vaporization surface area and the heat exchange surface area, thereby facilitating the water vaporization. It can usually be selected from among metal or ceramic type fiber materials and sintered materials or the like.

Moreover, it is advantageous to fill the super heating part 7 and the mixing part 11 with the same material as provided in the water vaporization part 8 in order to facilitate the object and the performance of these parts. A pump can be used in the water supply part 3 and an air blower can be used in the air supply part 2.

It should be noted that the hydrogen generator according to the present invention can preferably be operated by automatically controlling the quantity of the water and the fuel to be supplied by means of computer or the like but such controlling device is omitted in FIG. 1.

In this embodiment, the hydrocarbon type fuel and the water as the raw materials are supplied from an upper part in FIG. 1 and flows downward. To the contrary, the exhaust gas flows upward in the combustion chamber 5 from the combustion part 4 provided in the lower part.

Here, the flow of the exhaust gas and the flow of the raw materials are at reverse direction with each other, namely the flow direction of the exhaust gas and the flow direction of the raw materials are counter to each other, therefore the heat exchange proceeds effectively and stepwise according to the position of each part. The reforming part 6 that requires the highest temperature is placed in the closest position to the combustion part; the introduction part for the raw materials having the lowest temperature, especially the water vaporization part is placed in the farthest down the exhaust gas passage where the lowest temperature is required. An effective heat exchange proceeds between the flow of the exhaust gas and the flow of the raw materials.

In this embodiment, the reforming part 6 and the water vaporization part 8 or the like are placed inside the combustion chamber 5, yet their position is not limited to this as far as they are placed in such a way that the heat exchange can be conducted. For example, similar effects can be obtained from a constitution where the reforming part and the water vaporization part or the like are brought in contact with the combustion chamber 5 in such a way that they cover the combustion chamber 5.

Next, the operation of the hydrogen generator according to this embodiment will be described.

Usually, before starting-up or activating the apparatus, an inert gas is supplied to the fuel supply part 1 and the combustion part 4 is activated to heat the reforming part 6. Next, when the reforming catalyst in the reforming part 6 reaches the temperature where it can exhibit a sufficient activity, the raw material (city gas in this case), after desulfurated by way of the desulfuration part 18, is supplied to the mixing part 11 and the water is supplied to the water vaporization part 8 from the water supply part 3.

The water vapor formed by vaporizing in the water vaporization part 8 is mixed with the city gas in the mixing part 11 and preheated in the super heating part 7 to have higher temperature. The gas mixture is then supplied to the reforming part 6 and reacts on the reforming catalyst, generating a reformed gas rich in hydrogen. The reformed gas is discharged from the reformed gas exit 14 and carried to the next step.

The supply of the inert gas is stopped appropriately at the time when the reforming part is confirmed to have reached a temperature suitable for steam reforming by detecting the temperature in the reforming part. Here, the combustion heat produced in the combustion part 4 moves to the exhaust gas and the exhaust gas heats successively the reforming part 6, the super heating part 7, the mixing part 11 and the water vaporization part 8, reducing its temperature by the heat exchange and is discharged outside the apparatus from the exhaust vent 9.

The reforming catalyst in the reforming part 6 usually needs to be heated to around 700° C., therefore the constitution of the heat insulating part 10 is important. At the same time, how to collect the heat retained in the exhaust gas that is in the downstream of the reforming part 6 is a key point in order to improve the heat efficiency of the apparatus.

In this point of view, it is the most advantageous measure to place the water vaporization part 8 in the farthest downstream of the exhaust gas. In other words, it is advantageous for the heat exchange because the water has particularly low temperature among the raw materials and the heat transfer together with vaporization can be expected to have a high heat transfer coefficient. That is to say, the exhaust gas with a slightly lower temperature due to the upstream heat exchange can supply heat sufficient for water vaporization.

As a result, the exhaust gas discharged from the exhaust vent 9 has a low temperature after being subjected to a sufficient heat exchange, therefore the heat efficiency of the apparatus is improved and it is also effective in view of safety.

Here, the water vaporization part 8, the mixing part 11 and the heating part 7 are separately constituted successively, but a plurality of them can functionally or structurally be integrated. In that case, however, it is the most effective way to placed the water vaporization part in the farthest down the flow of the exhaust gas.

Embodiment 2

Figure 2:
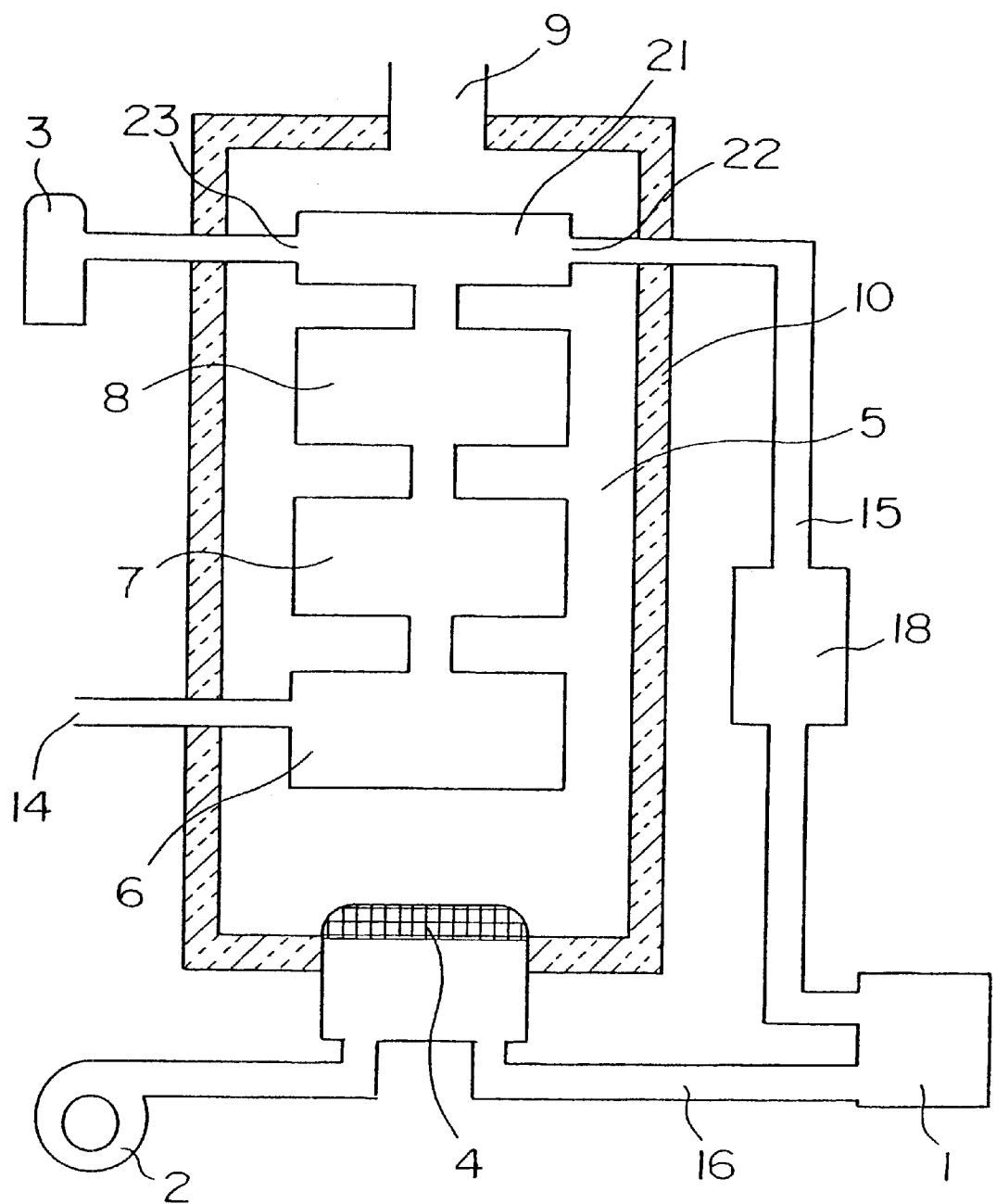
FIG. 2 is a schematic view showing the constitution of a hydrogen generator according to the second embodiment of the present invention.

FIG. 2 is a schematic view showing the constitution of a hydrogen generator according to the second embodiment of the present invention. The same reference numerals are given as in FIG. 1 to repeated parts and an explanation for such parts is omitted. The hydrogen generator as shown in FIG. 2 comprises a heating (pre-heating) part 21 for raw material mixture to which a fuel gas is supplied from a fuel gas supply port 22 and water as the raw material is supplied from a water supply port 23.

Therefore, the pre-heating part 21 for raw materials also serves as a mixing part for mixing each material. The raw material mixture mixed here is carried to the water vaporization part 8 and the water in the raw material mixture vaporizes here. Subsequently, the raw material mixture is carried to the reforming part 6 by way of the heating part 7 and the reforming reaction proceeds on the reforming catalyst. An obtained reformed gas rich in hydrogen is carried to the next step through a reformed gas exit 14.

In this constitution, by providing the pre-heating part 21 for the raw material mixture further down the water vaporization part 8, the heat retained in the exhaust gas moves by the heat exchange and is used more effectively. That is, the heat efficiency of the hydrogen generator according to the second embodiment is further improved comparing with the hydrogen generator according to the first embodiment.

Embodiment 3

Figure 3:
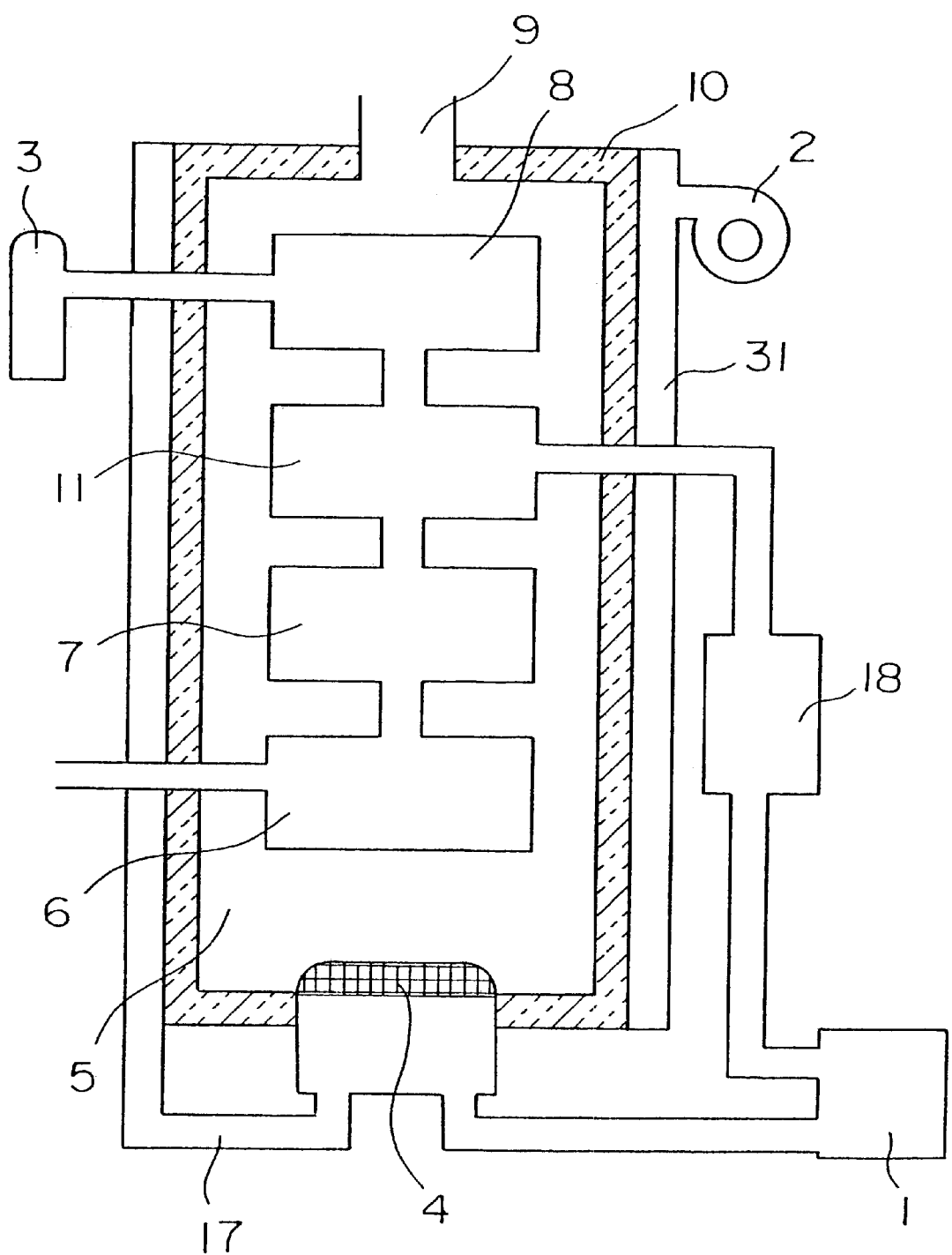
FIG. 3 is a schematic view showing the constitution of a hydrogen generator according to the third embodiment of the present invention.

FIG. 3 is a schematic view showing the constitution of the hydrogen generator according to the third embodiment of the present invention. The same reference numerals are given as in FIGS. 1 and 2 to repeated parts and an explanation for such parts is omitted.

The hydrogen generator according to this embodiment is provided with a pre-heating part 31 for air for combustion on the periphery of the apparatus. This constitution enables to lower the temperature on the periphery of the apparatus to prevent the heat dissipation from the apparatus, thereby significantly improving the heat efficiency. This structure can also be recommended in terms of safety.

Furthermore, this constitution enables to reduce the heat loss from the exhaust gas as well as the heat loss from the outer wall of the apparatus, thereby further improving the heat efficiency of the apparatus.

It should be noted that the pre-heating part 31 for air for combustion is provided outside the heat insulating part 10, but it can be placed inside the heat insulating part 10 or in the downstream of the water vaporization part 8.

In addition, the embodiments of the present invention as shown in FIGS. 1 to 3 can be combined accordingly within the scope of the spirit of the present invention. For example, the pre-heating part 31 for air for combustion can be used as the pre-heating part for hydrocarbon type fuel or water used as the raw materials.

According to the present invention, the reforming part and the water vaporization part are placed inside the combustion chamber or brought into contact with the combustion chamber, bringing the flow direction of the raw, material to counter the flow direction of the exhaust gas, enabling an efficient heat exchange, thereby providing an hydrogen generator exhibiting an excellent heat efficiency. Moreover, a hydrogen generator that is further improved in terms of heat efficiency, safety and operation can be provided by taking a constitution in which the heat dissipating from the outer wall is collected to be used to preheat the air or the like, lowering the temperature on the outer wall of the apparatus.

What is claimed is:

1. A hydrogen generator for generating a hydrogen gas, comprising at least a fuel supply part for supplying a hydrocarbon type fuel, a combustion part, a water supply part, a gas mixing part for mixing said hydrocarbon type fuel and a water, a reforming part filled with said reforming catalyst, a water vaporization part, and an air supply part, said hydrogen generator having a structure such that said water vaporization part and said reforming part are heated by an exhaust gas generated in said combustion part, and said water is vaporized by heat of said exhaust gas.

2. The hydrogen generator in accordance with claim 1, wherein an air to be supplied to said combustion part is heated by combustion heat of said combustion part.

3. The hydrogen generator in accordance with claim 1, further comprising a pre-heating part for heating at least one of said hydrocarbon type fuel and an air to be supplied to combustion, which is provided on the periphery of said combustion part.

4. The hydrogen generator in accordance with claim 1, wherein the flow of said exhaust gas, and the flow of a mixed gas of said hydrocarbon type fuel and said water are in a direction opposite to one another.

5. The hydrogen generator in accordance with claim 1, wherein said water vaporization part is placed in the upstream of said gas mixing part, and said water is vaporized before being mixed with said hydrocarbon type fuel.

6. The hydrogen generator in accordance with claim 1, wherein said water vaporization part is placed in the downstream of said gas mixing part, and said water is vaporized after being mixed with said hydrocarbon type fuel.

7. The hydrogen generator in accordance with claim 1, wherein said water vaporization part and said reforming part are contained in a combustion chamber.

* * * * *

UNITED STATES PATENT AND TRADEMARK OFFICE
CERTIFICATE OF CORRECTION

PATENT NO. : 6,607,703 B1  Page 1 of 1
DATED : August 19, 2003
INVENTOR(S) : Takeshi Tomizawa et al.

It is certified that error appears in the above-identified patent and that said Letters Patent is hereby corrected as shown below:

<u>Title page,</u>
Item [57], ABSTRACT,
Line 4, after the word "gas" delete ",".

Signed and Sealed this

Thirteenth Day of January, 2004

JON W. DUDAS
*Acting Director of the United States Patent and Trademark Office*